United States Patent

Kawai et al.

[11] Patent Number: 4,588,159
[45] Date of Patent: May 13, 1986

[54] PINCH VALVE DEVICE

[75] Inventors: Yoshio Kawai, Musashino; Kiyoshi Kitagawa, Komae, both of Japan

[73] Assignee: Kureha Kagaku Kogyo Kabushiki Kaisha, Tokyo, Japan

[21] Appl. No.: 556,550

[22] Filed: Nov. 30, 1983

[30] Foreign Application Priority Data

Dec. 10, 1982 [JP] Japan .................. 57-216541

[51] Int. Cl.[4] ............................... F16L 55/14
[52] U.S. Cl. ............................... 251/4; 251/9
[58] Field of Search ............ 251/4, 9, 10, 6, 7, 251/8, 66, 74, 89, 96, 107, 109, 114, 119

[56] References Cited

U.S. PATENT DOCUMENTS

| 628,391 | 7/1899 | Clarke | 251/9 |
|---|---|---|---|
| 1,876,988 | 9/1932 | Lormor | 251/9 |
| 2,649,635 | 8/1953 | Peterson | 251/9 |
| 2,796,228 | 6/1957 | Kelly | 251/9 |
| 3,390,860 | 7/1968 | Kavanu | 251/9 |
| 3,473,738 | 10/1969 | De Matta | 251/9 |
| 3,539,081 | 11/1970 | Norton | 251/9 |
| 4,046,363 | 9/1977 | Whitley . | |
| 4,262,876 | 4/1981 | Willatt | 251/9 |
| 4,407,434 | 10/1983 | Kempf | 251/7 |

FOREIGN PATENT DOCUMENTS

| 2632868 | 2/1977 | Fed. Rep. of Germany . |
| 1023320 | 3/1953 | France . |
| 254906 | 11/1946 | Switzerland . |
| 1582387 | 1/1981 | United Kingdom . |

Primary Examiner—Samuel Scott
Assistant Examiner—Helen Ann Odar
Attorney, Agent, or Firm—Oblon, Fisher, Spivak, McClelland & Maier

[57] ABSTRACT

A pinch valve device comprising a nipping element having a pair of nipping portions adapted to be brought nearer to and apart from each other and to nip a resilient tube therebetween when brought nearer with each other to thereby close a passage in the tube, and a stop element adapted to stop at least one of the nipping portions, tended to be apart from each other by the resilient repulsion of the resilient tube, at a predetermined spacing allowing to close the passage in the resilient tube when the nipping portions are brought nearer to each other than the predetermined spacing against the resilient repulsion of the resilient tube can surely close the passage in the resilient tube and reduce the degradation of the tube.

9 Claims, 5 Drawing Figures

PINCH VALVE DEVICE

This invention concerns a pinch valve or pinch cock for use as a pinch valve device that nips a resilient tube made of elastic or resilient material to close the passage in the tube.

A pinch valve device known so far comprises a pair of nipping portions adapted to be brought nearer to and apart from each other and to nip a resilient tube therebetween when brought nearer to each other thereby close the passage in the tube.

However, since the paired nipping portions are forcibly biased by a biasing mechanism for bringing the portions nearer to each other in the conventional pinch valve device, there is fear that the resilient tube is nipped with an excessive force than required for closing or interrupting the passage in the resilient tube, by which the tube is liable to be degraded at the nipped part and, in addition, the deformed tube does not some time resume its original shape even after the removal of the nipping force applied thereto.

This invention has been made in view of the foregoings based on a concept that a liquid flow in a resilient tube such as a rubber tube can be kept stopped, once the resilient tube is deformed under the nipping force thereto so that the liquid flow can be stopped, even when the nipping force is slightly reduced thereafter, thereby minimizing the deformation of the resilient tube and lengthening the duration of the life of the tube.

The object of this invention is to provide a pinch valve device capable of minimizing the degradation in a resilient tube.

In accordance with this invention, the above object can be attained by a pinch valve device comprising a nipping means having a pair of nipping portions adapted to be brought nearer to and apart from each other and to nip a resilient tube therebetween when brought nearer with each other to thereby close a passage in the tube, and means adapted to stop at least one of the nipping portions tended to be apart from each other by the resilient repulsion of the resilient tube, at a predetermined spacing allowing to close the passage in the resilient tube when the nipping portions are brought nearer to each other than the predetermined spacing against the resilient repulsion of the resilient tube.

In one preferred embodiment of this invention, the stop means comprises a first engaging part integrally formed to one of the nipping portions, and a second engaging part connected to the other of the nipping portions and adapted to be engaged with the first engaging part so as to prevent the one of nipping portions from being moved apart from the other of nipping portions in excess of the predetermined spacing or distance, when the pair of the nipping portions are brought nearer to each other than the predetermined spacing.

This invention is to be descirbed in more details referring to the accompanying drawings, by which the foregoing and other objects, as well as the features of this invention will be made clearer in which:

FIGS. 1 and 2 show a pinch valve device as a preferred embodiment according to this invention.

Figure 1:
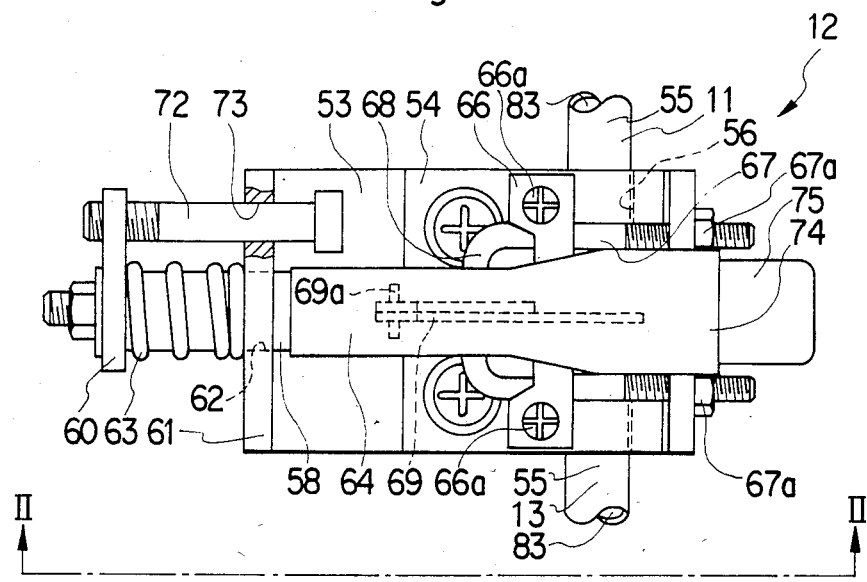
FIG. 1 is a partially broken explanatory front view of a pinch valve device as a preferred embodiment of this invention.
Figure 2:
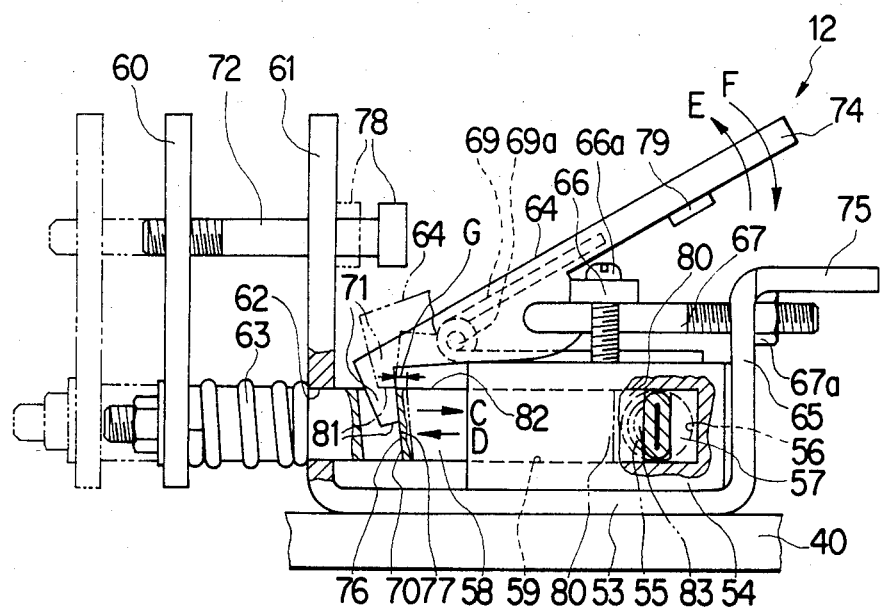
FIG. 2 is a partially broken explanatory view of the pinch valve device along II—II in FIG. 1.

In a pinch valve device 12 illustated in the FIGS. 1 and 2, a frame 53 is secured to a base block 40 and a valve main body 54 of the pinch valve device 12 is mounted to the frame 53. The valve body 54 has an aperture 56 through which is inserted a resilient tube 55 composed of integrated tube parts 11, 13, a stationary nipping portion or member 57 in the form of a semi- or partial cylinder and a cylinder hole 59 through which is fitted another nipping portion or member 58 in the form of straight rod movably along directions C, D, the direction C, D being perpendicular to the extending direction of the aperture 56. The movable nip member 58 movably passes through and protrudes from an aperture 62 formed in a grip wall portion 61 of the frame 53, and another grip wall or plate member 60 is secured to the protruded end of the movable nip element 58 while opposing to the grip wall or plate portion 61. A helical spring 63 is provided between the wall members 60 and 61 so as to resiliently bias the wall member 60 in the direction D apart from the wall member 61. An engaging lever 64 is connected to a U-shaped pivot shaft member 67 supported by an extended wall 65 of the frame 53 and a retainer member 66 such that the enaging lever 64 is rotatable around the pivot axis portion 68 of the U-shaped shaft member 67 in the directions E, F in a plane perpendicular to the pivot axis 68 while being biased by a spring 69 between the lever 64 and the valve body 54 in the direction E. The retainer 66 is held by screws 66a connected to the valve body 54. Numeral 69a is a pin mounted at both ends thereof by the lever 64 so as to support the spring 69. The engaging lever 64 has a hooked engaging part 71 that can be engaged with a oblique hole 70 or oblique face 76 of the hole 70 as another engaging part formed at an intermediate position of the movable nip member 58 so as to prevent the nip member 58 from displacing in the direction D and thus it serves as a stop means for stopping the movement of the nip member 58 apart from the nip member 57. Reference numeral 72 represents a guide rod 72 fixed at one end thereof to the grip plate 60 and loosely inserted through a guide hole 73 in the grip wall member 61 for guiding the movable nip element 58 in the direction C or D, and numeral 74 represents a grip end for the engaging lever 64 disposed near the other grip wall portion 75 of the frame 53.

The engaging part 71 has an engaging face 77 adapted to be in abutment against an engaging face 76 of the hole 70 in the engaged state, and the engaging face 77 is inclined such that the moment of the force in the direction F around the pivot shaft 68 in the direction F given by the biasing force of the spring 63 to the engaging lever 64 through the abutted faces 76, 77 is actually or substantially smaller than the moment of the force in the direction E around the shaft 68 caused by the biasing force of the spring 69 to the engaging lever 64. A nut 67a is threadingly engaged over ends of the pivot shaft 67 for adjusting the distance between the extended wall 65 and the pivot shaft 68. Reference numerals 78 and 79 represent a stop and a damper respectively.

The resilient tube to be nipped by the pinch valve device of this invention may be a so-called flexible tube so long as the tube has an adequate resiliency, and may be made of polymeric material, synthetic or natural rubber or the like.

The operation of the pinch valve device 12 being thus constituted in a compact structure is to be explained.

When the engaging lever 64 is rotated in the direction F by gripping the grip wall portions 74, 75 of the valve device 12, for instance, between operator's fingers, the nipping part 80 of the movable nip member 58 is retracted or protruded under the biasing force of the spring 63 in the direction D or the spacing between the nipping part 80 and the nipping portion 57 is made greater till the stop 78 abuts against the grip wall portion 61 of the frame 53, and the top end 81 of the engaging part 71 of the engaging lever 64 abuts against the side 82 of the nip member 58 to keep open the passage 83 in the resilient tube 55 inserted through the apertures 56 (refer to the state of the tube 55 shown by the imaginary line in FIG. 2). On the other hand, if it is intended to close the passage 83 in the resilient tube 55 by the pinch valve device 12, the operator grips the grip wall members 60, 61, for example, between his fingers to move the grip wall member 60 toward the grip wall member 61 in the direction C against the biasing force of the spring 63. As the grip wall member 60 is displaced toward the grip wall member 61 in the direction C, the movable nip member 58 and thus the nipping part 80 thereof is brought nearer to the stationary nip member 57 in the direction C reducing the distance or spacing between nip members 57, 58 to elastically deform the resilient tube 55 relatively flat between the stationary nip member 57 and the nipping part 80 thereby close the passage 83 in the tube 55. The nut 67a is previously adjusted so that the engaging face 77 on the engaging part 71 of the engaging lever 64 is set at a position approximately flush with the face 76 of the hole 70, when the nipping member 58 is set at a position just to close the passage 83. After the closure of the passage 83, when the movable nip element 58 is further displaced slightly in the direction C against the resiliency of the resilient tube 55 and the stretching force for the spring 63, a small gap G is formed between the engaging face 77 on the engaging part 71 of the engaging lever 64 and the face 76 of the hole 70 in the movable nip member 58 and, accordingly, the engaging part 71 of the engaging lever 64 is displaced rotationally by the biasing force of the spring 69 in the direction E and fitted or inserted into the hole 70 in the movable nip member 58. Then, when the gripping force for the grip wall members 60, 61 is released by detaching the fingers, the face 76 of the hole 70 in the movable nip element 58 is returned in the direction D till the position where the plane 76 of the hole 70 is abutted against the plane 77 on the engaging part 71 of the engaging lever 64 and inhibited (stopped) by the plane 76 from the movement in the direction D by the resilient repulsion of the resilient tube 55 and the stretching force of the spring 63. The passage 83 in the tube 55 can be closed while retaining the deformation of the resilient tube 55 as small as possible upon stopping of the nip member 58 by previously adjusting the position of the pivot shaft 68 relative to the extended wall portion 65 by the nut 67a depending on the associated factors such as the diameter, wall thickness and resiliency of the resilient tube 55.

In the foregoing, a predetermined spacing or distance between the nip members 57 and 58 capable of closing the passage 83 in the resilient tube 55 corresponds to the spacing or distance between the nip member 57 and the part 80 of the nip member 58 when the movable nip member 58 is stopped by the engaging lever 64, and this distance can be adjusted, for example, by the nut 67a depending on the various factors of the resilient tube 55.

As described above, in the pinch valve device 12 of this embodiment, since there is little fear that an excess deformation will be applied to the resilient tube 55 for a long time, the degradation in the resilient tube 55 can be minimized, as well as the opening and closing of the passage 83 in the tube 55 can be easily carried out by one-touch or simple operation, or by merely gripping the grip wall members 74, 75 or 60, 61 to facilitate the operation.

The spring 63 may not be provided, if desired. Further, in addition to the nip member 58, the nip member 57 may also be made movable. In a case where another pinch valve device (not shown) having the similar structure to that of the pinch valve device 12 is provided for opening and closing a passage in another resilient tube, the respective grip wall members 60 of the two pinch valve devices 12, 12 may be connected by means of an adequate parallel movement means, so that the grip members 60 and the likes of the two valve devices 12, 12 can be displaced substantially simultaneously by the actuation of the parallel movement means to carry out the closure or the opening by the two pinch valve devices 12, 12 substantially simultaneously.

As described above, in the pinch valve device 12 of this embodiment, the passage in the resilient tube can be closed by merely actuating the grip wall member 60 without continuing to exert an excess nipping force on the resilient tube and the passage in the resilient tube can be opened by merely actuating the grip part 74.

Accordingly, the pinch valve device 12 is useful, for example, as a valve to close and open a passage for feeding and discharging the sample liquid connected to a cell for accomodating the sample liquid whose electrophoretic property is to be observed in an electrophoretic measuring apparatus.

Figure 3:
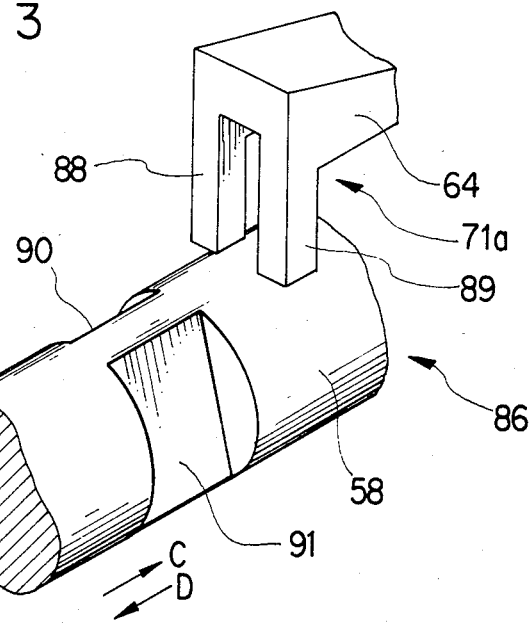
FIGS. 3 and 4 are respectively illustrative views of engaging parts of pinch valve devices as different modified embodiments of this invention.
Figure 4:
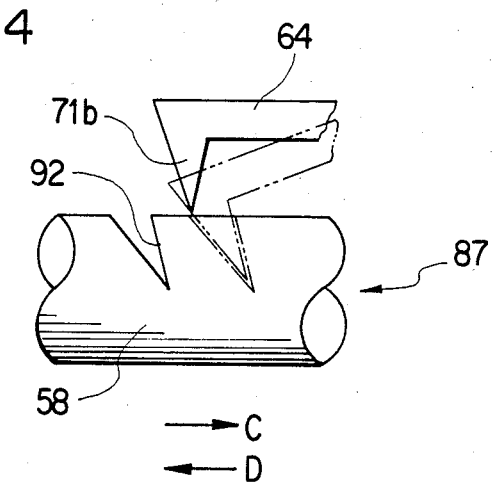

FIG. 3 and FIG. 4 respectively show parts of pinch valve devices 86 and 87 as modified embodiments of this invention, the remaining parts of the valve devices 86, 87 may be substantially the same as those of the valve device 12.

In the pinch valve device 86 shown in FIG. 3, an engaging part 71a of the engaging lever 64 is bifurcated in the form of hooked fork ends 88, 89 and, correspondingly, the nip member 58 is formed with grooves 90, 91 to be engaged respectively with two fork ends 88 and 89 of the engaging part 71a, instead of the hole 70 in the valve device 12.

In the pinch valve device 87 shown in FIG. 4, an engaging part 71b of the engaging lever 64 is tapered toward the top end thereof into a wedge shape and, correspondingly, the nip member 58 is formed with a groove 92 in a shape generally complementary to the shape of the engaging part 71b, instead of the hole 70 in the valve device 12.

It will be apparent that the pinch valve devices 86, 87 can be operated in the substantially same manner as the pinch valve device 12.

Further, the engaging lever 64 in each of the pinch valve devices 12, 86, 87 may be designed to move linearly instead of the rotational displacement.

Furthermore, the movable nip member 58 may be made rotatable, instead of the linear movement in the directions C, D, by pivotally supporting the nip member 58 at its intermediate position in the longitudinal direction thereof. Such a modification can be attained, for instance, by forming a nipping part to be brought nearer to and apart from the stationary nipping portion by the pivotal movement of the nip member 58 to one end of the member 58, biasing the nip member 58 by means of a coil spring or the like so that the nipping part of the nip member 58 can be apart from stationary nipping part, and securing to the nip member 58 a grooved sector plate constituting a latchet mechanism that inhibits the movement of the nipping part to be apart from the stationary nipping portion at a predetermined spacing or distance in combination with a finger member so that the nipping part at one end of the nip member 58 brought nearer to the stationary nipping portion by gripping the other end of the movable nip element 58 than the predetermined spacing can be stopped at the predetermined spacing by the latchet mechanism against the force of the coil spring and the resiliency of the resilient tube.

In the pinch valve devices according to this invention, the shape of the nip part or portion may be in any desired configuration such as a semi-cylinder or wedge shape, or it may be greater, smaller or equal with respect to the tube diameter, so long as the passage in the resilient tube can be closed effectively by a relatively small force.

Figure 5:
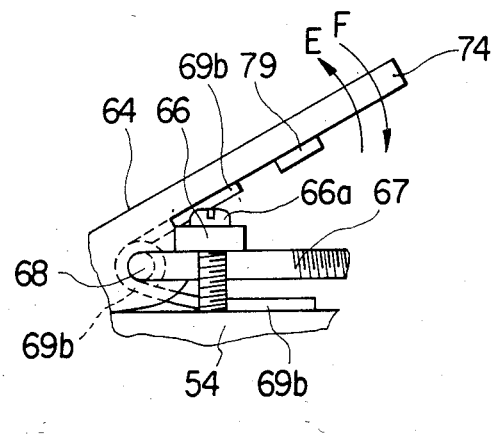
FIG. 5 is an explanatory view of a portion of a modified pinch valve device according to this invention.

Furthermore, instead of mounting the spring 69 around the pin 69a, the spring 69b similar to the spring 69 may be mounted around the shaft 68 of the U-shaped member 67 so as to bias the lever 64 in the direction E as shown in FIG. 5 if desired, for example in the case where it is difficult to form a space for mounting the pin 69a and the spring 69 in the lever 64 because of its small size.

As described above, since the pinch valve device according to this invention comprises means adapted to stop at least one of the nipping portions tended to be apart from each other by the resilient repulsion of the resilient tube at a predetermined spacing or distance allowing to close the passage in the resilient tube when the nipping portions are brought nearer to each other than the predetermined spacing or distance against the resilient repulsion of the resilient tube, the passage in the resilient tube can be closed surely, as well as the degradation of the resilient tube can be minimized.

What is claimed is:

1. A pinch valve device comprising:
    a nipping means having a pair of nipping portions adapted to be brought nearer to and apart from each other and to nip a resilient tube therebetween when brought nearer to each other to thereby close a passage in the tube, one of the nipping portion being in the form of a rod mounted in a pinch valve body, said rod being movable in a longitudinal direction of the rod so as to be brought nearer to and apart from the other of the nipping portions which is stationary and positioned in the valve body, the valve body having an aperture through which the resilient tube is inserted, the aperture extending perpendicularly to the moving direction of the movable nipping portion, said one nipping portion in the form of the rod having a nipping part at one end thereof facing the stationary nipping portion in the valve body and being connected at the other end thereof to a gripping mechanism adapted to displace the movable nipping part nearer to the stationary nipping portion, the gripping mechanism comprising a first gripping member fixed to the other end of the movable nipping portion and a second gripping member fixed to the valve body, the movable nipping portion passing substantially through the valve body, a spring means adapted to bias the movable nipping portion in a direction apart from the stationary nipping portion; and
    a stop means adapted to stop said one of the nipping portions at a predetermined spacing as said nipping portions are biased apart from each other by the resilient repulsion of said resilient tube, said predetermined spacing being sized for allowing closure of the passage in the resilient tube when the nipping portions are brought nearer to each other than the predetermined spacing against the resilient repulsion of the resilient tube, the stop means having a first engaging part integrally formed with said one nipping portion, and a second engaging part connected to the other nipping portion and adapted to be engaged with the first engaging part so as to prevent said one nipping portion from being moved apart from the other nipping portion beyond said predetermined spacing, when the pair of the nipping portions are brought nearer to each other than the predetermined spacing;
    wherein the first engaging part includes a hole formed at an intermediate part of the movable nipping portion, and the second engaging part includes a hooked part formed at one end of a lever which is pivotably connected to the valve body at an intermediate position thereof, the lever being biased by a second spring means so that the hooked part may be forced to the intermediate part of the movable nipping portion.

2. A pinch valve device comprising:
    a nipping means having a pair of nipping portions adapted to be brought nearer to and apart from each other and to nip a resilient tube therebetween when brought nearer to each other to thereby close a passage in the tube, one of the nipping portion being in the form of a rod mounted in a pinch valve body, said rod being movable in a longitudinal direction of the rod so as to be brought nearer to and apart from the other of the nipping portions which is stationary and positioned in the valve body, the valve body having an aperture through which the resilient tube is inserted, the aperture extending perpendicularly to the moving direction of the movable nipping portion, said one nipping portion in the form of the rod having a nipping part at one end thereof facing the stationary nipping portion in the valve body and being connected at the other end thereof to a gripping mechanism adapted to displace the movable nipping part nearer to the stationary nipping portion, the gripping mechanism comprising a first gripping member fixed to the other end of the movable nipping portion and a second gripping member fixed to the valve body, the movable nipping portion passing substantially through the valve body, a spring means adapted to bias the movable nipping portion in a direction apart from the stationary nipping portion; and
    a stop means adapted to stop said one of the nipping portions at a predetermined spacing as said nipping portions are biased apart from each other by the resilient repulsion of said resilient tube, said predetermined spacing being sized for allowing closure of the passage in the resilient tube when the nipping portions are brought nearer to each other than the predetermined spacing against the resilient repulsion of the resilient tube, the stop means having a first engaging part integrally formed with said one nipping portion, and a second engaging part connected to the other nipping portion and adapted to be engaged with the first engaging part so as to prevent said one nipping portion from being moved apart from the other nipping portion beyond said predetermined spacing, when the pair of the nipping portions are brought nearer to each other than the predetermined spacing;

wherein the first engaging part includes grooves formed at an intermediate part of the movable nipping portion, and the second engaging part includes hooked fork ends formed at one end of a lever which is pivotally connected to the valve body at an intermediate position thereof, the lever being biased by a second spring means so that the hooked fork ends may be forced to an intermediate part of the movable nipping portion.

3. A pinch valve device comprising:

a nipping means having a pair of nipping portions adapted to be brought nearer to and apart from each other and to nip a resilient tube therebetween when brought nearer to each other to thereby close a passage in the tube, one of the nipping portion being in the form of a rod mounted in a pinch valve body, said rod being movable in a longitudinal direction of the rod so as to be brought nearer to and apart from the other of the nipping portions which is stationary and positioned in the valve body, the valve body having an aperture through which the resilient tube is inserted, the aperture extending perpendicularly to the moving direction of the movable nipping portion, said one nipping portion in the form of the rod having a nipping part at one end thereof facing the stationary nipping portion in the valve body and being connected at the other end thereof to a gripping mechanism adapted to displace the movable nipping part nearer to the stationary nipping portion, the gripping mechanism comprising a first gripping member fixed to the other end of the movable nipping portion and a second gripping member fixed to the valve body, the movable nipping portion passing substantially through the valve body, a spring means adapted to bias the movable nipping portion in a direction apart from the stationary nipping portion; and a stop means adapted to stop said one of the nipping portions at a predetermined spacing as said nipping portions are biased apart from each other by the resilient repulsion of said resilient tube, said predetermined spacing being sized for allowing closure of the passage in the resilient tube when the nipping portions are brought nearer to each other than the predetermined spacing against the resilient repulsion of the resilient tube, the stop means having a first engaging part integrally formed with said one nipping portion, and a second engaging part connected to the other nipping portion and adapted to be engaged with the first engaging part so at to prevent said one nipping portion from being moved apart from the other nipping portion beyond said predetermined spacing, when the pair of the nipping portions are brought nearer to each other than the predetermined spacing;

wherein the first engaging part includes a groove formed at an intermediate part of the movable nipping portion, and the second engaging part includes a hooked wedge formed at one end of a lever which is pivotably connected to the valve body at an intermediate position thereof, the lever being biased by a second spring means so that the hooked wedge may be forced to the intermediate part of the movable nipping portion.

4. The pinch valve device according to claim 1, wherein the lever is connected to the valve body through a connecting means allowing adjustment of a position of the hooked engaging part in the longitudinal direction of the movable nipping portion.

5. The pinch valve device according to claim 4, wherein the connecting means comprises a U-shaped shaft pivotably supporting the lever at an intermediate portion of the shaft and nuts engaged with threaded ends of said U-shaped shaft penetrating through a wall portion fixed to the valve body.

6. The pinch valve device according to claim 2, wherein the lever is connected to the valve body through a connecting means allowing adjustment of a position of the hooked engaging part in the longitudinal direction of the movable nipping portion.

7. The pinch valve device according to claim 6, wherein the connecting means comprises a U-shaped shaft pivotably supporting the lever at an intermediate portion of the shaft and nuts engaged with threaded ends of said U-shaped shaft penetrating through a wall portion fixed to the valve body.

8. The pinch valve device according to claim 3, wherein the lever is connected to the valve body through a connecting means allowing adjustment of a position of the hooked engaging part in the longitudinal direction of the movable nipping portion.

9. The pinch valve device according to claim 8, wherein the connecting means comprises a U-shaped shaft pivotably supporting the lever at an intermediate portion of the shaft and nuts engaged with threaded ends of said U-shaped shaft penetrating through a wall portion fixed to the valve body.

* * * * *